United States Patent [19]

Mano

[11] Patent Number: 5,737,390
[45] Date of Patent: Apr. 7, 1998

[54] DIGITAL EXCHANGE SYSTEM WITH FUNCTION OF DISPLAYING OPERATION STATE OF SYSTEM

[75] Inventor: Hiroshi Mano, Tokyo, Japan

[73] Assignee: Kabushiki Kaisha Toshiba, Kawasaki, Japan

[21] Appl. No.: 304,835

[22] Filed: Sep. 13, 1994

[30] Foreign Application Priority Data

Sep. 20, 1993 [JP] Japan .................. 5-232730

[51] Int. Cl.⁶ .................. H04M 3/08; H04M 3/22
[52] U.S. Cl. .................. 379/10; 379/14; 379/15; 379/26
[58] Field of Search .................. 379/1, 2, 5, 10–17, 379/26, 242, 244, 247, 248; 370/13, 14, 241, 242, 247; 371/20.1, 22.1, 20.4, 25.1, 26, 29.1

[56] References Cited

U.S. PATENT DOCUMENTS

| | | | |
|---|---|---|---|
| 3,997,879 | 12/1976 | Markley | 364/141 |
| 4,345,324 | 8/1982 | Smitt | 379/15 |
| 4,750,175 | 6/1988 | Brenneman | 370/242 |
| 4,766,594 | 8/1988 | Ogawa | 371/22 |
| 4,833,579 | 5/1989 | Anderson | 371/38 |
| 4,972,452 | 11/1990 | Check | 379/2 |
| 4,972,453 | 11/1990 | Daniel | 379/10 |
| 5,036,318 | 7/1991 | Bachhuber | 370/85.1 |
| 5,276,727 | 1/1994 | Kim | 379/15 |
| 5,343,461 | 8/1994 | Barton | 370/13 |
| 5,359,646 | 10/1994 | Johnson | 379/26 |
| 5,566,223 | 10/1996 | Taguchi | 379/10 |

*Primary Examiner*—Curtis Kuntz
*Assistant Examiner*—Vijay Shankar
*Attorney, Agent, or Firm*—Finnegan, Henderson, Farabow, Garrett & Dunner, L.L.P.

[57] ABSTRACT

A digital key telephone system which is connected to a digital network via a digital channel, a transmission error which has occurred on the digital channel is detected, and upon detection of the transmission error, information representing the transmission error is stored in an error table. When a display request of a transmission error is input from a digital key telephone, error information stored in the error table is read out, the readout information is transferred to the digital key telephone, and the information is displayed on a display of the telephone.

7 Claims, 14 Drawing Sheets

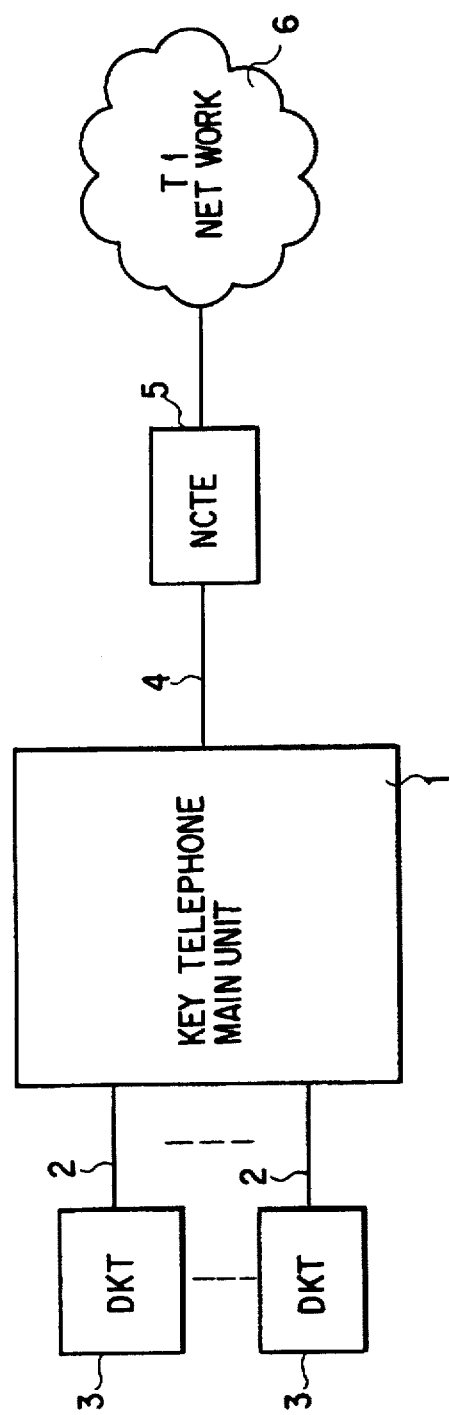
F I G. 1

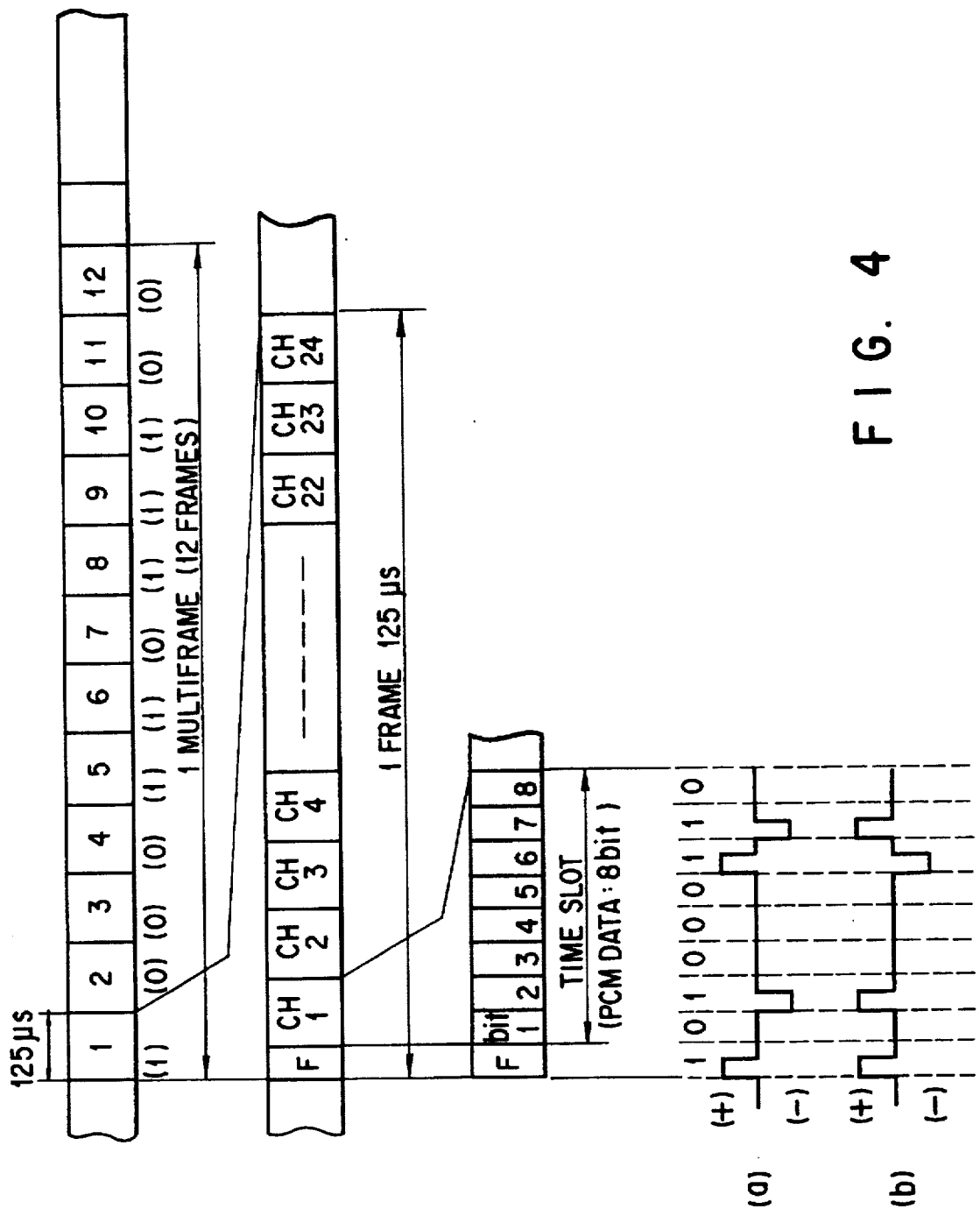
F I G. 4

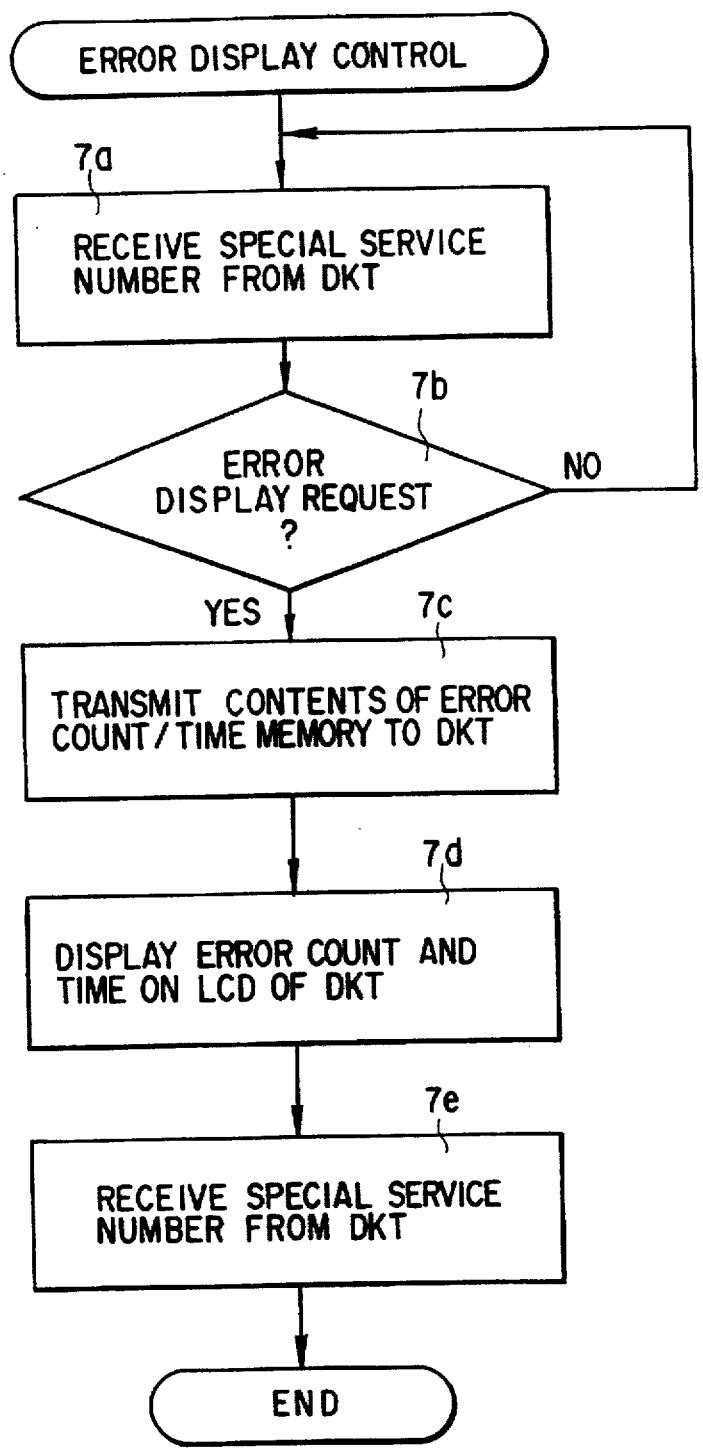
F I G. 7

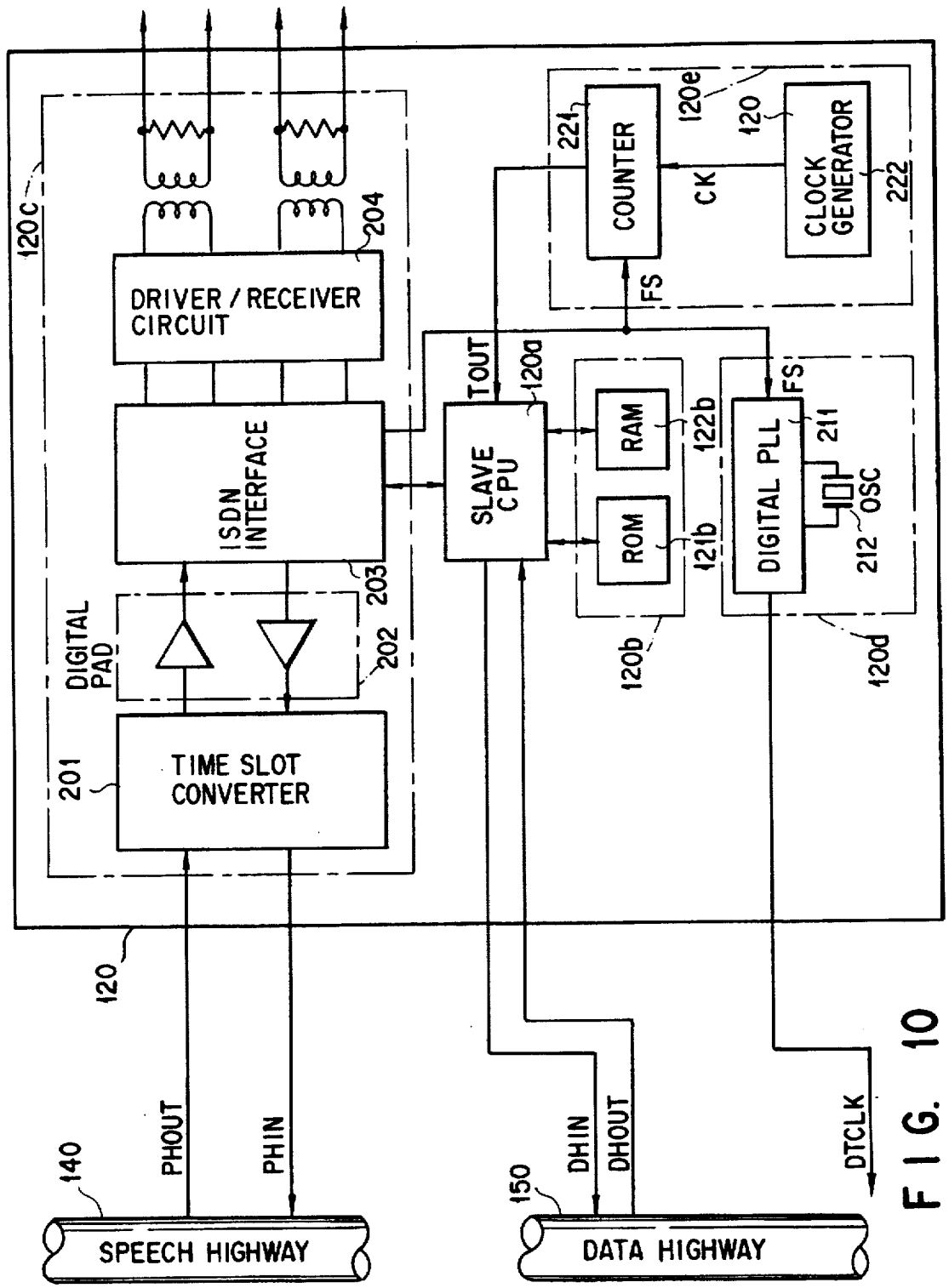
F I G. 10

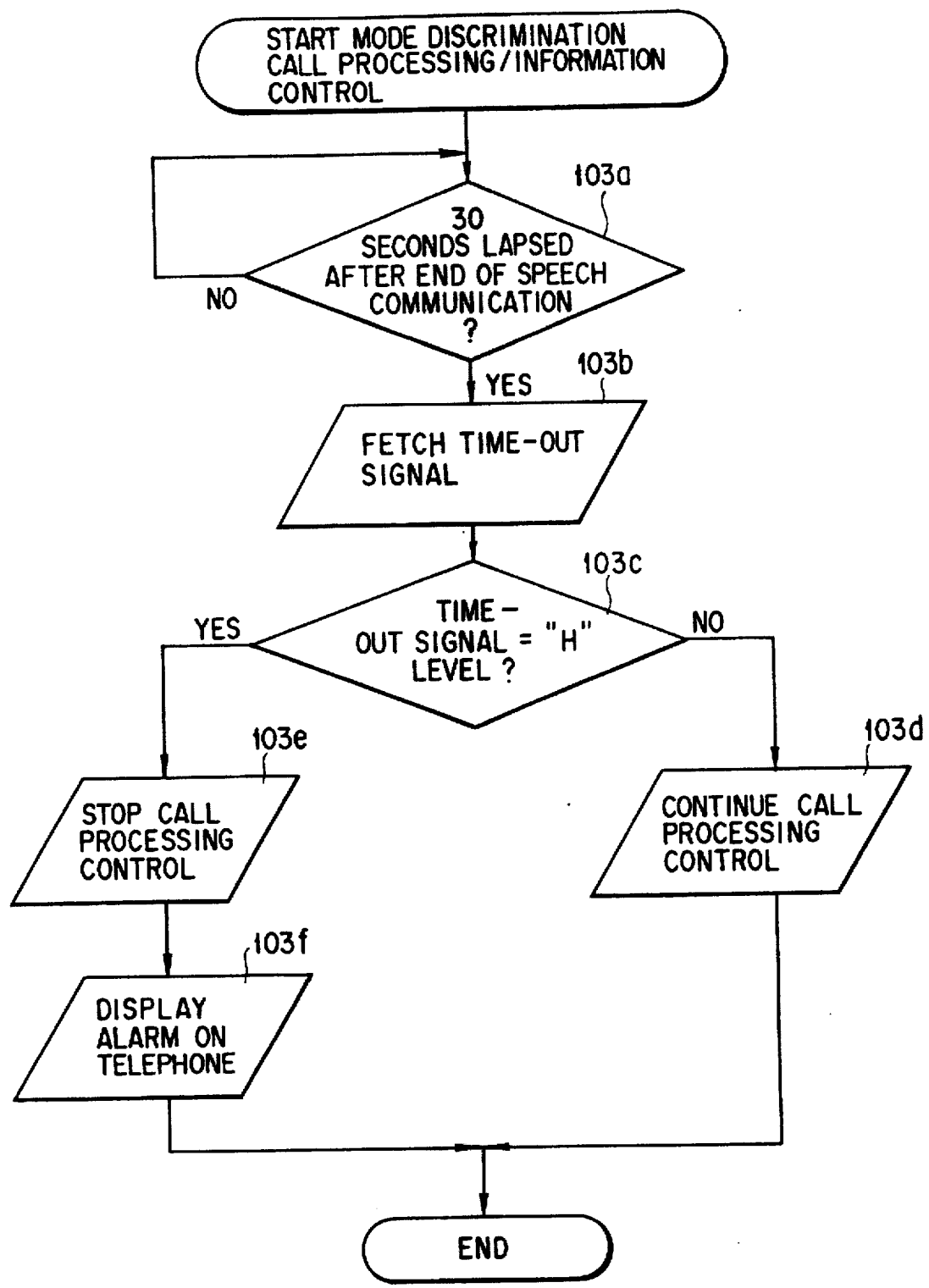
F I G. 13

5,737,390

DIGITAL EXCHANGE SYSTEM WITH FUNCTION OF DISPLAYING OPERATION STATE OF SYSTEM

BACKGROUND OF THE INVENTION

1. Field of the Invention

The present invention relates to a digital exchange system such as a digital key telephone system, a digital private branch exchange system, or the like, which is connected to a digital network such as a T1 network, an ISDN, or the like when it is used.

2. Description of the Related Art

In recent years, a digital key telephone system, which is connected to a digital channel of a digital network such as an ISDN when it is used, is known. According to a key telephone system of this type, a high-quality speech communication and a high-speed data communication can be realized using wide-band characteristics and various expansion functions of the digital network.

In a conventional key telephone system of this type, various transmission errors often occur in an interface unit due to, e.g., a line error of the digital channel. The transmission errors include, e.g., a frame error, a multiframe error, and a bipolar violation. The frame error is a detection failure of a frame sync pattern for every two frames as repetitions of "1010..." during reception of a digital signal sent from the digital network. The multiframe error means a failure of normally detecting a multiframe sync pattern "001110". Furthermore, the bipolar violation is an error in which a code rule of an AMI code transmitted via the digital network, i.e., a rule for alternately repeating positive and negative polarities of transmission pulses is not complied.

When these transmission errors have occurred on the digital channel, faults such as deterioration of speech communication quality, disconnection of a speech communication, and the like take place undesirably. For this reason, when such a transmission error has occurred in a conventional system, a maintenance person diagnoses the cause of the error, and exchanges a circuit board of a digital key telephone system. However, in the conventional digital key telephone system, a maintenance person must actually make a speech communication, and diagnose the cause of the error on the basis of a fault state which occurs at that time. As a result, the diagnosis of the cause of the fault requires much time and labor. When a fault having no reproducibility has occurred, it is difficult to accurately determine the cause of the fault.

On the other hand, a digital key telephone system connected to a plurality of digital channels must operate in synchronism with network clocks supplied from the digital network via one of these digital channels. Thus, in a conventional system, prior to the start of the operation of the digital key telephone system, for example, a maintenance person selects one of the plurality of digital channels as a sync line. Then, the maintenance person requests a maintenance person of the digital network to which the sync line is connected to set the sync line in a normal start mode. In the normal start mode, network clocks are normally supplied from the digital network to the digital key telephone system regardless of the presence/absence of an originating call or a terminating call. Note that the digital channels other than the sync line are set in a so-called call start mode for supplying network clocks from the digital network to the key telephone system only when an originating call or a terminating call is generated.

However, such start modes are manually set by the maintenance person of the digital network or a service engineer of the digital key telephone system. For this reason, when the maintenance person or the service engineer is unaccustomed to the work or has an insufficient skill level, the normal start mode may not be reliably set for the sync line. When the start mode is erroneously set, the conventional system does not have any means for simply confirming the setting error at that time. For this reason, the system which is set in a wrong start mode is subjected to an operation, and as a result, a normal operation cannot be guaranteed.

SUMMARY OF THE INVENTION

It is the first object of the present invention to provide a digital exchange system which allows a maintenance person to easily and accurately diagnose the cause of a fault caused by a transmission error within a short period of time, and to quickly and adequately take a countermeasure against the fault.

It is the second object of the present invention to provide a digital exchange system which allows a maintenance person to quickly and easily confirm a wrong start mode, and can prevent the system from operating in the wrong start mode.

In order to achieve the first object, according to the first invention, in a digital exchange system connected to a digital network via a digital channel, a transmission error which has occurred on the digital line is detected by transmission error detection means, and when the transmission error is detected, information representing the transmission error is stored in error information storage means. Then, error information display means displays at least one of the information representing the transmission error detected by the transmission error detection means and the error information stored in the error information storage means.

As a result, according to the first embodiment, each time a transmission error has occurred on the digital channel, information representing the error is stored in the error information storage means, and the error information is displayed on the error information display means. For this reason, a maintenance person can easily and accurately diagnose the cause of the error on the basis of the displayed error information within a short period of time, and can quickly and adequately take a countermeasure against the error.

In an exchange system constituted by a digital key telephone main unit and digital key telephones, a digital key telephone may send a display request to the digital key telephone main unit, the digital key telephone main unit may transfer error information to the digital key telephone in response to the request, and the error information may be displayed on a display of the digital key telephone. With this arrangement, a maintenance person can confirm the error information at an arbitrary digital key telephone.

Furthermore, when the digital key telephone main unit has a display, error information may be displayed on the display. With this arrangement, a maintenance person can confirm error information at the digital key telephone main unit.

Furthermore, when a maintenance terminal device is connected to the digital key telephone main unit, the maintenance terminal device may send a display request to the digital key telephone main unit, the digital key telephone main unit may transfer error information to the maintenance terminal device in response to the request, and the error information may be displayed on a display of the maintenance terminal device. With this arrangement, a maintenance person can confirm error information at the maintenance terminal device.

On the other hand, in order to achieve the second object, according to the second invention, a digital exchange system, which is connected to a digital communication network via a plurality of digital channels, and operates in synchronism with network clocks supplied from the digital network via one of the plurality of digital channels, comprises start mode discrimination means and mode display means. The start mode discrimination means discriminates whether a start mode set for the digital channel for supplying network clocks from the digital network is a first start mode for normally supplying network clocks or a second start mode for supplying network clocks during only a specific period including a communication period upon generation of a call, and the discriminated start mode is displayed on the mode display means.

As a result, according to the second invention, network clocks input via a sync digital channel are monitored in a standby state after the start mode is set, whether the start mode set for the sync digital line is the first or second start mode is discriminated based on the monitoring result, and the discrimination result is displayed. For this reason, after the start mode is set, a maintenance person can confirm the set start mode at that time on the basis of the displayed result. Therefore, when a wrong start mode is set, the maintenance person can immediately re-set the start mode. In this manner, a problem of an operation in a wrong start mode can be prevented, and the system can be reliably operated.

In an exchange system constituted by a digital key telephone main unit and digital key telephones, the digital key telephone main unit may transfer discrimination information of the start mode to a digital key telephone, and the transferred information may be displayed on a display of the digital key telephone. With this arrangement, a maintenance person can confirm the start mode at an arbitrary digital key telephone.

Furthermore, when the digital key telephone main unit has a display, the discrimination result of the start mode may be displayed on the display. With this arrangement, a maintenance person can confirm the start mode at the digital key telephone main unit.

Furthermore, when a maintenance terminal device is connected to the digital key telephone main unit, the digital key telephone main unit may transfer discrimination information of the start mode to the maintenance terminal device, and the transferred information may be displayed on a display of the maintenance terminal device. With this arrangement, a maintenance person can confirm the start mode at the maintenance terminal device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram showing the arrangement of a digital communication system including a digital key telephone system according to the first embodiment of the present invention;

FIG. 4 is a view showing the frame format of transmission data;

FIG. 7 is a flow chart showing the control sequence and control contents of error display control by the main CPU in the control unit;

FIG. 10 is a block diagram showing the arrangement of a network interface unit in the digital key telephone main unit shown in FIG. 9;

FIG. 13 is a flow chart showing the control sequence and control contents of start mode discrimination and call processing/information control;

DETAILED DESCRIPTION OF THE PREFERRED EMBODIMENTS (First Embodiment)

FIG. 1 is a schematic block diagram showing the arrangement of a digital communication system including a digital key telephone system according to the first embodiment of the present invention.

The digital key telephone system is constituted by a digital key telephone main unit 1 and a plurality of digital key telephones (DKTs) 3. These digital key telephones (DKTs) 3 are connected to the digital key telephone main unit 1 via extension transmission paths 2. Each digital key telephone 3 comprises a speech codec, a digital transmitter, and a liquid crystal display. The speech codec PCM-encodes/decodes an analog speech signal. The digital transmitter exchanges a PCM speech signal with the digital key telephone main unit 1. The digital key telephone main unit 1 is connected to an NCTE (Network control terminal equipment) 5 via a digital channel 4, and is connected to a digital network (T1 network) 6 via the NCTE 5.

Figure 2:
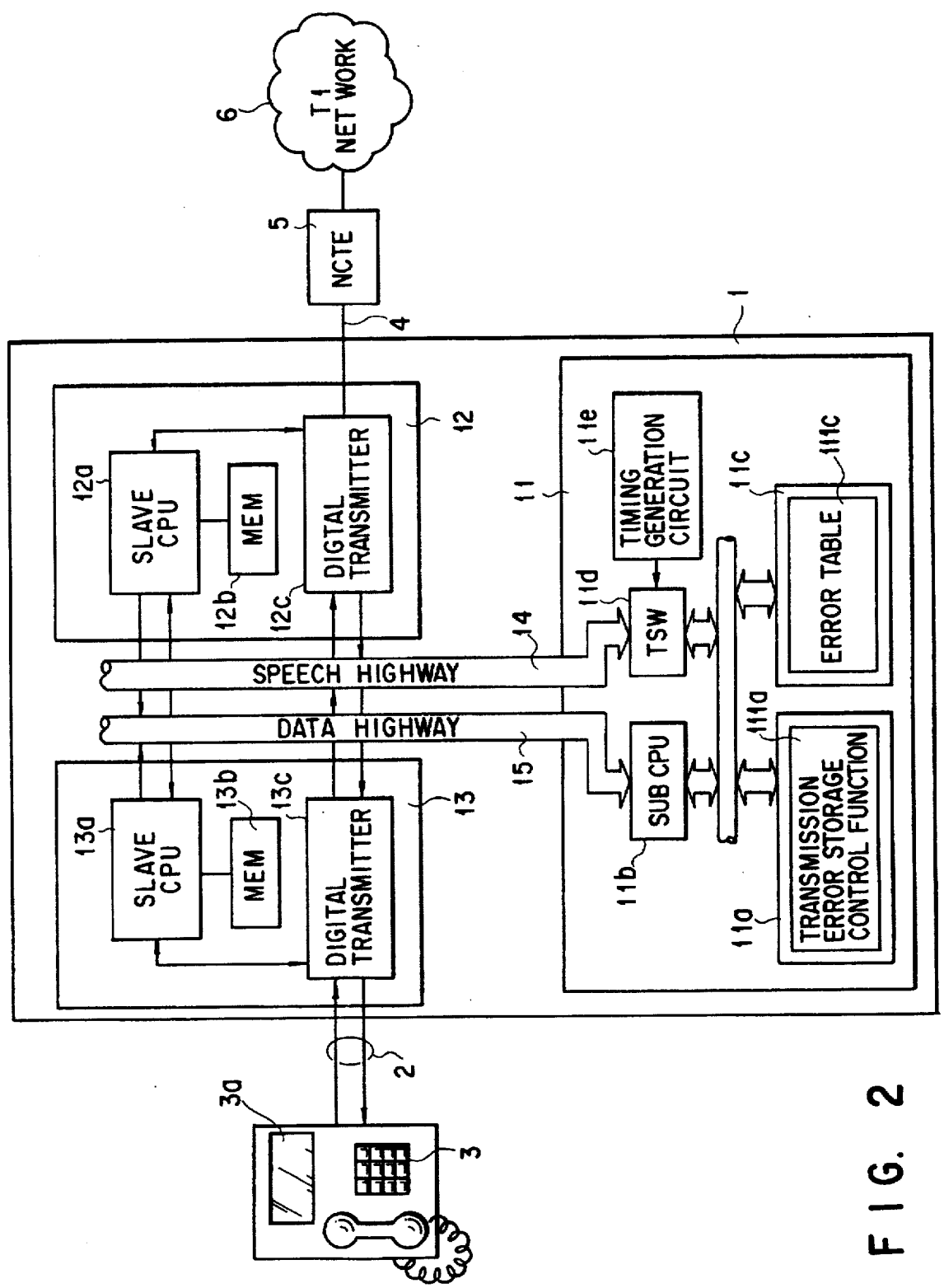
FIG. 2 is a block diagram showing the arrangement of a digital key telephone main unit shown in FIG. 1.

FIG. 2 is a block diagram showing the arrangement of the digital key telephone main unit 1. The digital key telephone main unit 1 comprises a control unit 11, a network interface unit 12, a telephone interface unit 13, a speech highway 14, and a data highway 15. Of these units, each of the network interface unit 12 and the telephone interface unit 13 is formed in a card shape, and a plurality of cards for each are set in the main unit 1.

The control unit 11 controls call processing, and has a main CPU 11a comprising, e.g., a microcomputer. The main CPU 11a is connected to a sub CPU 11b, a memory circuit (MEM) 11c, and a time switch (TSW) 11d via a bus.

Of these devices, the sub CPU 11b monitors exchange of control signals between the plurality of network interface units 12 and the plurality of telephone interface units 13. The memory circuit 11c comprises a ROM and a RAM, which store programs and control data required for the control operations of the main and sub CPUs 11a and 11b. The time switch 11d executes time-division exchange processing of a PCM speech signal in accordance with an instruction from the main CPU 11a. The control unit 11 includes a timing generation circuit 11e. The timing generation circuit 11e generates various timing signals required for the time-division exchange processing operation of the time switch 11d, and supplies them to the time switch 11d.

The telephone interface unit 13 comprises a slave CPU 13a, a memory circuit (MEM) 13b, and a digital transmitter 13c. The slave CPU 13a controls exchange of control signals between the network interface unit 12 and the control unit 11 via the data highway 15. The memory circuit 13b stores programs and control data required for the control operation of the slave CPU 13a. The digital transmitter 13c exchanges control signals and PCM speech signals between the digital key telephone 3 and the digital key telephone main unit 1.

The network interface unit 12 comprises a slave CPU 12a, a memory circuit (MEM) 12b, and a digital transmitter 12c. The slave CPU 12a controls exchange of control signals between the telephone interface unit 13 and the control unit 11 via the data highway 15. The memory circuit 12b stores programs and control data required for the control operation of the slave CPU 12a. The digital transmitter 12c exchanges control signals and PCM speech signals between the NCTE 5 and the digital key telephone main unit 1.

Figure 3:
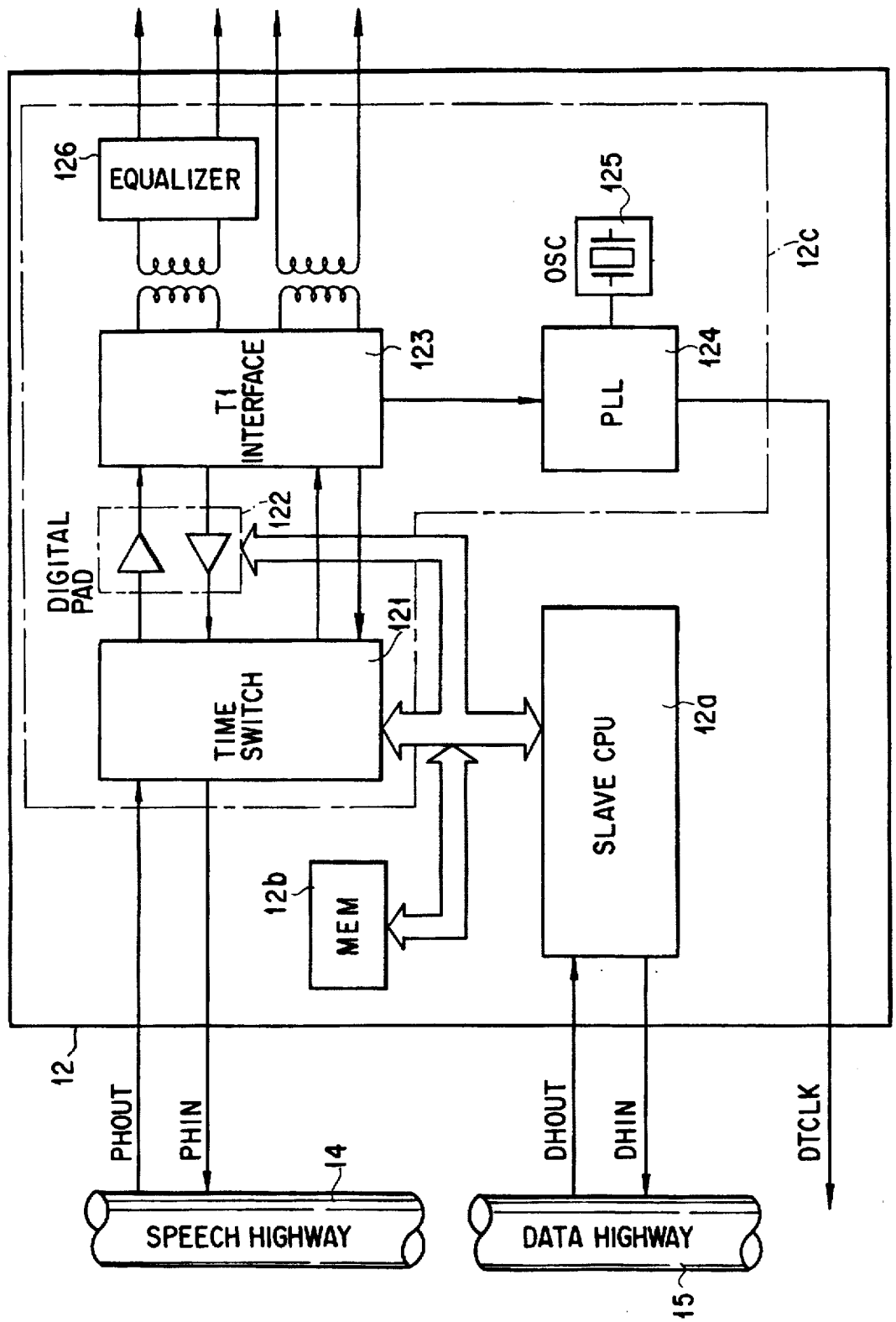
FIG. 3 is a block diagram showing the arrangement of a network interface unit in the digital key telephone main unit shown in FIG. 2.
Figure 12:
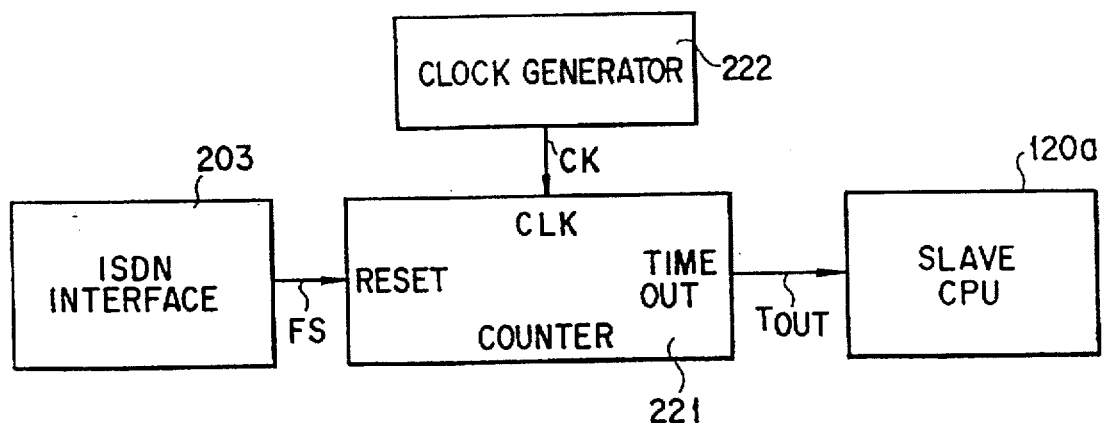
FIG. 12 is a block diagram showing the arrangement of a circuit portion for generating a time-out signal in the network interface unit shown in FIG. 10.

FIG. 3 is a block diagram showing in more detail the arrangement of the network interface unit 12. Referring to FIG. 12, the digital transmitter 12c comprises a time switch 121, a digital PAD 122, a network (T1) interface 123, a digital PLL 124, a reference oscillator 125, and an equalizer circuit 126.

Of these circuits, the network interface 123 has a function of forming a transmission frame by time-divisionally multiplexing PCM speech signals of a plurality of channels, and outputting the transmission frame onto the speech highway 14, and a function of demultiplexing a transmission frame received from the speech highway 14 into a plurality of channels, and selecting the PCM speech signals. The time switch 121 executes re-assignment processing of PCM speech signals (speech time slots) inserted in the transmission channels, and format conversion of control signals to be supplied to the network interface 123. The digital PAD 122 performs level adjustment of PCM speech signals exchanged between the speech highway 14 and the network interface 123. The equalizer circuit 126 shapes the transmission waveforms of PCM speech signals to be output onto the digital network 6. The digital PLL 124 extracts a frame sync signal from a transmission signal received from the digital network 6, and generates system clocks slave-synchronized with the frame sync signal.

FIG. 4 shows the format of the transmission frame formed by the network interface 123. Referring to FIG. 4, one multiframe is obtained by time-divisionally multiplexing 12 frames. Each of these frames has a length of 125 μsec, and one frame is obtained by time-divisionally multiplexing a frame bit F and 24 speech channels CH1 to CH24. A PCM speech signal consists of 8 bits, and this PCM speech signal (speech time slot) is inserted in one of the speech channels CH1 to CH24. The multiframe is transmitted at a transmission rate of 1.544 Mbps on the digital channel 4. In the LSB of each multiframe, a control bit is inserted for every 12 multiframes.

The network interface 123 has a transmission error detection function. Transmission errors include a bipolar violation, a frame error, and a multiframe error.

The bipolar violation is an error of not complying with the code rule of an AMI code, in which positive and negative polarity pulses alternately appear, as shown in a chart (a) in FIG. 4, as shown in a chart (b) in FIG. 4. The frame error is an error which disables normal reception of the frame bit F consisting of a predetermined specific pattern ("1" and "0" alternately appear at every other bit positions). Furthermore, the multiframe error is an error which disables normal reception of a multiframe sync pattern consisting of a predetermined specific pattern ("100011011100").

The transmission error detection function of the network interface 123 monitors generation of the transmission errors during transmission, and upon detection of a transmission error, it informs detection information representing the detection of the transmission error to the slave CPU 12a via the time switch 121. The slave CPU 12a transfers the detection information to the main CPU 11a in the control unit 11 via the data highway 15.

The main CPU 11a in the control unit 11 has a transmission error storage control function 111a. When the detection information of a transmission error is transferred from the slave CPU 12a in the network interface unit 12, the transmission error storage control function 111a registers the received detection information in an error table 111c in the memory circuit 11c. Upon reception of a read instruction of the registered transmission error by means of a special service number from the digital key telephone 3, the function 111a reads out the detection information of the transmission error from the error table 111c and outputs the readout information to the digital key telephone 3.

An operation associated with storage/display control of transmission errors in the digital key telephone system with the above-mentioned arrangement will be described below.

During transmission of a PCM speech signal, the network interface 123 in the network interface unit 12 monitors generation of various transmission errors.

In this state, assume that a frame error has occurred. The occurrence of the frame error is detected by the network interface 123, and a detection message is supplied to the slave CPU 12a. Upon reception of the message, the slave CPU 12a generates detection information representing the frame error, and transfers it to the main CPU 11a in the control unit 11 via the data highway 15.

Figures 5, 6:
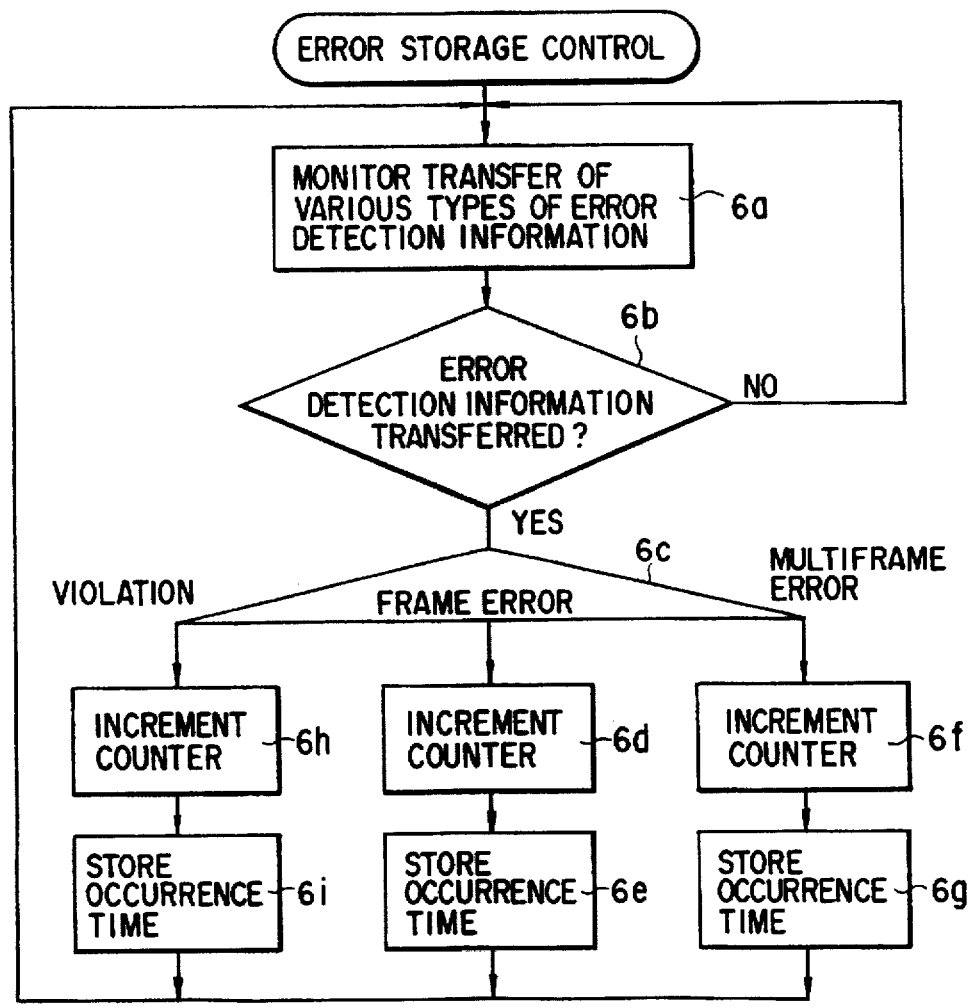
FIG. 5 is a view showing an example of the arrangement of an error table.
FIG. 6 is a flow chart showing the control sequence and control contents of error storage control by a main CPU in a control unit.

As shown in FIG. 6, the main CPU 11a monitors transfer of the detection information in steps 6a and 6b. In this state, when the detection information of the transmission error is transferred from the slave CPU 12a in the network interface unit 12, the main CPU 11a advances the control from step 6b to step 6c. In step 6c, the main CPU 11a identifies the type of the transmission error on the basis of the contents of the detection information. As a result of identification, if the transmission error is a frame error, the flow advances to step 6d, and the main CPU 11a increments the value of a counter for counting the number of times of occurrence of errors.

The flow advances to step 6e, and the main CPU 11a stores the error type in the error table 111c in the memory circuit 11c. In addition, the main CPU 11a stores the count value of the counter, i.e., the number of times of occurrence of errors, and error occurrence time in correspondence with the error type in the error table 111c. FIG. 5 shows an example of storage contents in the error table 111c.

On the other hand, when a multiframe error has occurred, a message indicating this is supplied from the network interface 123 to the slave CPU 12a, and the slave CPU 12a transfers detection information of the multiframe error to the main CPU 11a in the control unit 11. In this case, since the type of the transmission error is the multiframe error, the flow advances from step 6c to step 6f, and the main CPU 11a increments the value of a counter for counting the number of times of occurrence of multiframe errors. Thereafter, in step 6g, the main CPU 11a stores error type information indicating the multiframe error in the error table 111c, and also stores the number of times of occurrence of errors and error occurrence time in correspondence with the type information.

Also, when a violation has occurred, detection information of the violation is transferred from the network interface unit 12 to the main CPU 11a in the control unit 11 in the same manner as in the frame error or multiframe error, and the main CPU 11a stores error type information, the number of times of occurrence of errors, and error occurrence time in the error table 111c.

In this state, assume that, for example, a maintenance person dial-inputs a special service number for requesting display of the transmission error detection information at an arbitrary digital key telephone 3. At this time, the main CPU 11a in the control unit 11 monitors reception of the special service number from the digital key telephone 3 in steps 7a and 7b, as shown in FIG. 7. Therefore, upon reception of the special service number from the digital key telephone 3, the main CPU 11a detects reception of the special service number in steps 7a and 7b, and the flow then advances to step 7c. In step 7c, the main CPU 11a reads out one detection information from the error table 111c in the memory circuit 11c, and outputs the readout detection information to the digital key telephone 3, as the special service number output source, via the telephone interface unit 13. When the digital key telephone 3 receives the detection information from the digital key telephone main unit 1 after output of the special service number, the received detection information is displayed on an LCD display 3a.

When the maintenance person, who has confirmed the contents of one detection information, dial-inputs a special service number for requesting display of another transmission error detection information, the main CPU 11a in the digital key telephone main unit 1 reads out the next detection information from the error table 111c, and the readout detection information is supplied from the telephone interface unit 13 to the digital key telephone 3 as the special service number output source. This detection information is displayed on the LCD display 3a of the digital key telephone 3.

Similarly, each time the special service number is dial-input at the digital key telephone 3, the main CPU 11a in the digital key telephone main unit 1 sequentially reads out detection information from the error table 111c and sends the readout information to the digital key telephone 3. The detection information is then displayed on the LCD display 3a.

When the maintenance person, who has confirmed required detection information, dial-inputs an end special service number, the main CPU 11a in the digital key telephone main unit 1 confirms reception of the end special service number in step 7e, and ends the error transfer/display control.

As described above, in this embodiment, the network interface unit 12 monitors occurrence of a transmission error, and upon detection of the transmission error, a message indicating this is supplied to the main CPU 11a in the control unit 11. The main CPU 11a stores detection information of the transmission error in the error table 111c in the memory circuit 11c. In accordance with a special service number dial-input from the digital key telephone 3, the main CPU 11a reads out detection information from the error table 111c and transfers it to the digital key telephone 3. The transferred detection information is then displayed on the LCD display 3a.

Therefore, according to this embodiment, each time a transmission error has occurred, detection information of the error is automatically stored in the error table 111c, and the stored information is displayed on the LCD display 3a in accordance with a display request from the digital key telephone 3. For this reason, a maintenance person can easily and accurately diagnose the cause of the occurrence of the error on the basis of the displayed error information within a short period of time, and can quickly and adequately take a counter-measure against a fault.

(Second Embodiment)

Figure 8:
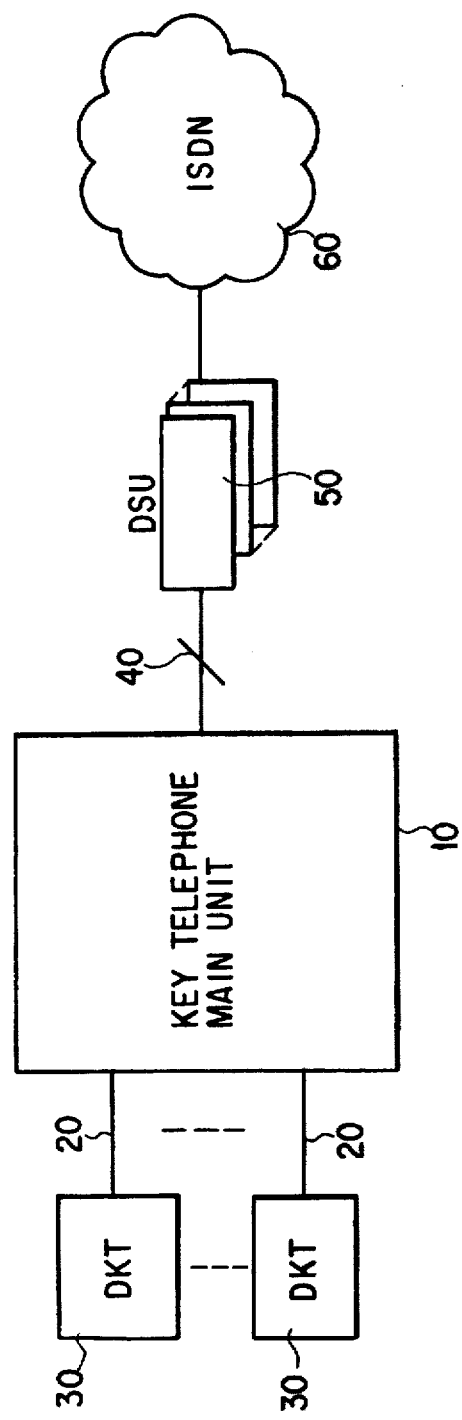
FIG. 8 is a schematic block diagram showing an ISDN communication system including a digital key telephone system according to the second embodiment of the present invention.

FIG. 8 is a schematic block diagram showing the arrangement of an ISDN communication system including a digital key telephone system according to the second embodiment of the present invention.

The digital key telephone system is constituted by a digital key telephone main unit 10, and a plurality of digital key telephones (DKTs) 30. These digital key telephones (DKTs) 30 are connected to the digital key telephone main unit 10 via extension transmission paths 20. Each digital key telephone 30 comprises a speech codec, a digital transmitter, and a liquid crystal display. The speech codec PCM-encodes/decodes an analog speech signal. The digital transmitter exchanges a PCM speech signal with the digital key telephone main unit 10.

The digital key telephone main unit 10 is connected to a DSU (Digital service unit) 50 via a plurality of digital channels 40, and is connected to an integrated service digital network (ISDN) 60 via the DSU 50.

Figure 9:
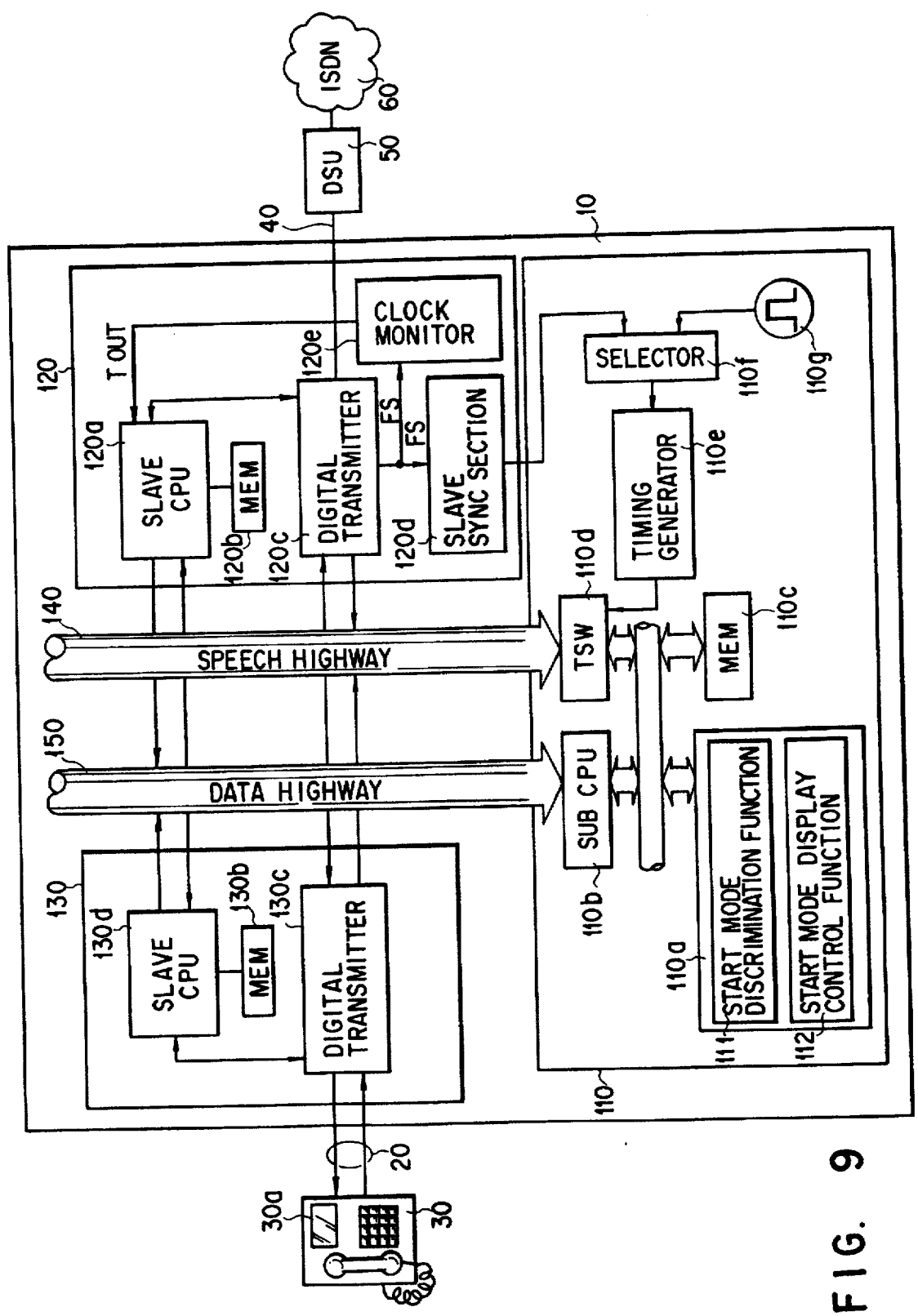
FIG. 9 is a block diagram showing the arrangement of a digital key telephone main unit shown in FIG. 8.

FIG. 9 is a block diagram showing the arrangement of the digital key telephone main unit 10. The digital key telephone main unit 10 comprises a control unit 110, an ISDN basic interface unit 120, a telephone interface unit 130, a speech highway 140, and a data highway 150. Of these units, each of the ISDN basic network interface unit 120 and the telephone interface unit 130 is formed into a card shape, and a plurality of cards for each are set in the main unit 10.

The control unit 110 controls call processing, and has a main CPU 110a comprising, e.g., a microcomputer. The main CPU 110a is connected to a sub CPU 110b, a memory circuit (MEM) 110c, and a time switch (TSW) 110d via a bus.

Of these circuits, the sub CPU 110b monitors exchange of control signals between the plurality of ISDN basic interface units 120 and the plurality of telephone interface units 130. The memory circuit 110c includes a ROM and a RAM, which store programs, control data, and the like required for the control operations of the main and sub CPUs 110a and 110b. The time switch 110d performs time-division exchange processing of PCM speech signals in accordance with an instruction from the main CPU 110a The control unit 110 includes a timing generator 110e, a selector 110f, and a clock oscillator 110g. The selector 110f alternatively selects master clocks DTCLK generated by a slave sync section 120d (to be described later) in the ISDN basic interface unit 120 and free-running clocks generated by the clock oscillator 110g, and supplies the selected clocks to the timing generator 110e. The timing generator 110e generates various timing signals required for the time-division exchange processing operation of the time switch 110d on the basis of the clocks selected by and supplied from the selector 110f, and supplies the generated timing signals to the time switch 110d.

The telephone interface unit 130 has a slave CPU 130a, a memory circuit (MEM) 130b, and a digital transmitter 130c. The slave CPU 130a controls exchange of control signals between the ISDN basic interface 120 and the control unit 110 via the data highway 150. The memory circuit 130b stores programs and control data required for the control operation of the slave CPU 130a. The digital transmitter 130c exchanges control signals and PCM speech signals between the digital key telephone 30 and the digital key telephone main unit 10.

The ISDN basic interface unit 120 comprises a slave CPU 120a, a memory circuit (MEM) 120b, a digital transmitter 120c, the slave sync section 120d, and a clock monitor 120e. The slave CPU 120a controls exchange of control signals between the telephone interface unit 130 and the control unit 110 via the data highway 150. The memory circuit 120b stores programs and control data required for the control operation of the slave CPU 120a. The digital transmitter 120c exchanges control signals and PCM speech signals between the DSU 50 and the digital key telephone main unit 10.

FIG. 10 is a block diagram showing the arrangement of the ISDN basic interface unit 120.

The digital transmitter 120c comprises a time slot converter 201, a digital PAD 202, an ISDN interface 203, and a driver/receiver circuit 204.

Of these circuits, the ISDN interface 203 has a function of executing multiplexing/demultiplexing processing of two B channels and a single D channel, a function of inserting and extracting control signals to and from the D channel under the control of the slave CPU 120a, and a function of extracting a frame signal from a signal received from the ISDN network 60 and supplying the extracted frame signal to the slave sync section 120d and the clock monitor 120e. The time slot converter 201 has a function of inserting/ extracting a PCM speech signal into/from a designated time slot on the speech highway 140 in accordance with an instruction from the slave CPU 120a. The digital PAD 202 performs level adjustment of PCM speech signals exchanged between the speech highway 140 and the ISDN interface 203.

The slave sync section 120d comprises a digital PLL 211 and a reference oscillator 212. The digital PLL 211 generates master clocks DTCLK in synchronism with a frame signal extracted from received data by the ISDN interface 203, and supplies the master clocks DTCLK to the selector 110f of the control unit 110.

The clock monitor 120e comprises a counter 221 and a clock generator 222. FIG. 12 shows the counter 221 and its peripheral circuit arrangement. A frame signal FS output from the ISDN interface 203 is input to the reset terminal (Reset) of the counter 221. The counter 221 counts clocks CK generated by the clock generator 222, and resets the count value each time it receives a frame signal FS. The count value of the counter 221 overflows and the counter 221 generates a time-out signal $T_{OUT}$ when the frame signal FS is not continuously input for a period of three pulses. The time-out signal $T_{OUT}$ is input to the slave CPU 120a, and is supplied from the slave CPU 120a to the main CPU 110a in the control unit 110 via the data highway 150.

The main CPU 110a in the control unit 110 has a start mode discrimination function and a start mode display control function in addition to the normal call processing function.

The start mode discrimination function discriminates on the basis of the time-out signal supplied from the ISDN basic interface unit 120 whether a normal start mode or a call start mode is set for the ISDN lines 40. In the normal start mode, network clocks are normally supplied from the ISDN network 60 to the ISDN lines 40 regardless of whether or not a call is generated. On the other hand, in the call start mode, network clocks are not supplied from the ISDN network 60 to the ISDN lines 40 in a standby state but they are supplied from the ISDN network to the ISDN lines 40 only when an originating or terminating call is generated, and supply of the network clocks stops after an elapse of a predetermined period of time (e.g., 30 seconds) after the end of a speech communication.

When the start mode discrimination function discriminates that the normal start mode is not set, the start mode display control function determines that the start modes are not correctly set for the ISDN lines 40. Then, the start mode display control function stops the following call processing control, generates alarm information representing that the start modes are not correctly set, and outputs the alarm information from the telephone interface unit 130 to the digital key telephone 30. In the digital key telephone 30, upon reception of the alarm information, the contents of the alarm information are displayed on an LCD display 30a.

An operation associated with monitoring of the start modes in the digital key telephone system with the above-mentioned arrangement will be described below.

After an engineering work for connecting the digital key telephone system to the ISDN network 60, a maintenance person conducts a call originating or call terminating test for the ISDN network. During this test, network clocks are supplied from the ISDN network 60 to the ISDN lines 40.

Figure 11A:
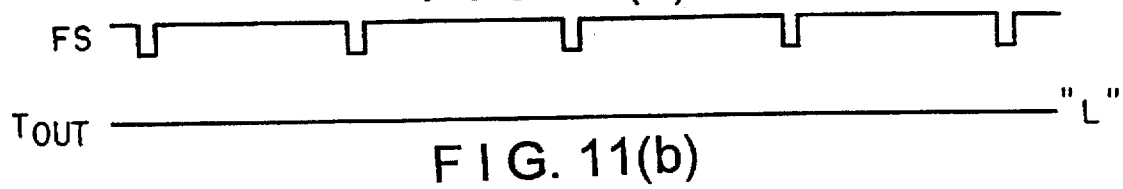
FIGS. 11 (a) and 11 (b) are timing charts for explaining a network clock detection operation in the network interface unit shown in FIG. 10.

At this time, in the ISDN basic interface unit 120, the clock monitor 120e performs a count operation of clocks CK using the frame signal FS output from the ISDN interface 203 as a reset signal. In this count operation, as long as the frame input signal FS is input, i.e., as long as network clocks are supplied from the ISDN network, the count value of the counter 221 is reset, and no time-out signal $T_{OUT}$ is generated. More specifically, the time-out signal $T_{OUT}$ is kept at "L" level, as shown in FIG. 11(a).

Figure 11B:
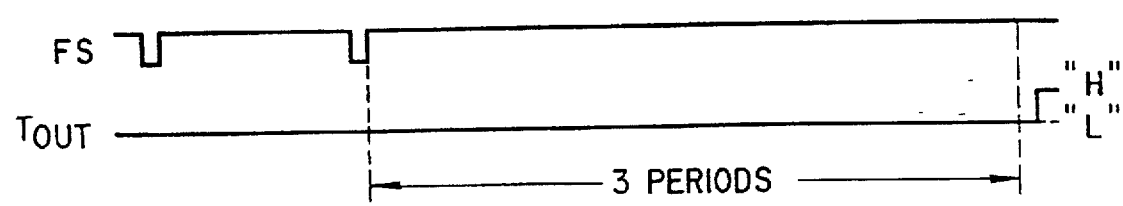

In contrast to this, when supply of network clocks from the ISDN network 60 is stopped, and the frame signal FS is not input, the counter 221 generates an "H"-level time-out signal $T_{OUT}$ after an elapse of a time interval corresponding to three periods of the frame signal FS, as shown in FIG. 11(b). Information representing the "H"-level time-out signal $T_{OUT}$ is supplied from the slave CPU 120a to the main CPU 110a in the control unit 110 via the data highway 150.

On the other hand, when the call originating or terminating test is finished, the main CPU 110a in the control unit 110 executes start mode discrimination and call processing/ information control. FIG. 13 is a flow chart showing the control sequence and control contents of this control.

More specifically, the main CPU 110a monitors in step 103a whether or not a predetermined period of time (e.g., 30 seconds) has elapsed after the end of a speech communication of the call originating or terminating test. If YES in step 103a, the main CPU 110a fetches information representing the time-out signal $T_{OUT}$ from the ISDN basic interface unit 120 in step 103b. In step 103c, the main CPU 110a checks if the time-out signal $T_{OUT}$ is at "H" level. If NO in step 103c, the main CPU 110a determines that the normal start mode is set for the ISDN line 40. Thereafter, the flow advances to step 103d, and the main CPU 110a permits the following call processing control.

In contrast to this, assume that the time-out signal $T_{OUT}$ is at "H" level. In this case, the main CPU 110a determines that the call start mode is set for the ISDN line 40. Then, the flow advances to step 103e, and the main CPU 110a inhibits the following call processing control. In addition, the main CPU 110a generates alarm information in step 103f, and controls the telephone interface unit 130 to transfer the alarm information to the digital key telephone 30. In the digital key telephone 30, the alarm information is decoded, and is displayed on the LCD display 30a.

Therefore, a maintenance person can confirm that the normal start mode is not set for the ISDN lines 40 by observing the alarm information displayed on the LCD display 30a of the digital key telephone 30. Then, the maintenance person can request a service engineer of the ISDN network to re-set the normal start mode.

As described above, according to this embodiment, the digital key telephone main unit 10 discriminates whether or not a start mode set for the ISDN lines 40 by the ISDN network 60 is the normal start mode. As a result of this discrimination, if it is determined that the normal start mode is not set, alarm information is transferred to the digital key telephone 30 and is displayed. Thus, a setting error of the start mode can be quickly and clearly informed to the maintenance person. Therefore, the maintenance person can re-set the start mode at an early timing, and an operation in a wrong start mode can be prevented from being started.

(Third Embodiment)

In this embodiment, a digital private branch exchange is provided with a function of monitoring a transmission error which has occurred on a digital channel of a public digital network, transferring the monitoring result to an extension digital key telephone, and displaying the result on a display of the telephone, and a function of discriminating a start mode set for the digital channel of the public digital network, transferring the discrimination result to the extension digital key telephone, and displaying the result on the display of the telephone.

Figure 16:
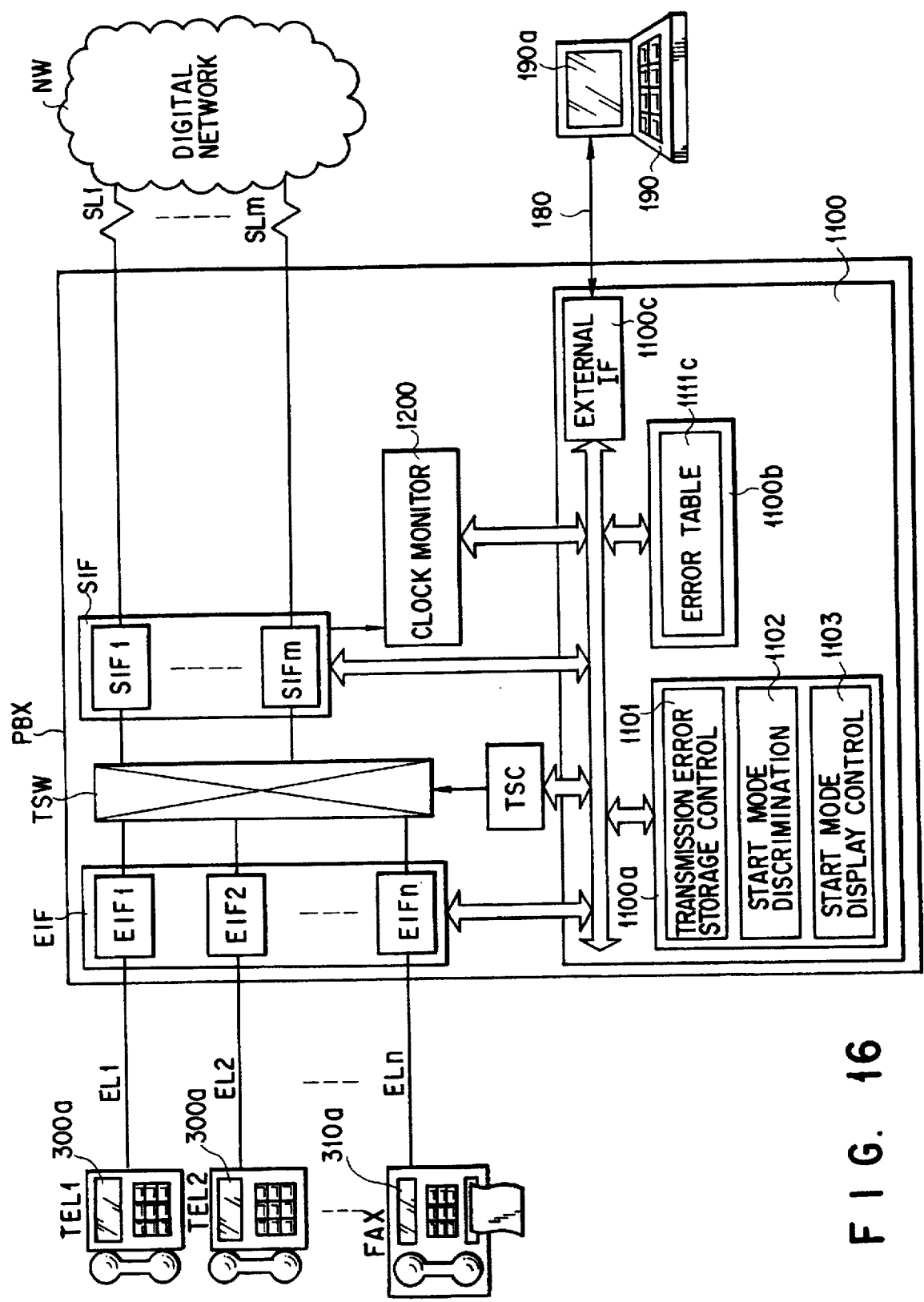
FIG. 16 is a block diagram showing the arrangement of a digital private branch exchange according to the third embodiment of the present invention.

FIG. 16 is a block diagram showing the arrangement of a digital private branch exchange according to this embodiment.

A digital private branch exchange PBX comprises a time switch TSW, a time switch controller TSC, an extension interface unit EIF, a subscriber line interface unit SIF, a central control unit 1100, and a clock monitor 1200.

The extension interface unit EIF has a plurality of extension interface circuits EIF1 to EIFn, which are connected to extension terminal devices via extensions EL1 to ELn. The extension terminal devices include digital key telephones TEL1 and TEL2, a facsimile device FAX, a data terminal device, and the like. The subscriber line interface unit SIF has a plurality of subscriber line interface circuits SIF1 to SIFm, which are connected to a public digital network NW via digital subscriber lines SL1 to SLm. The time switch TSW selectively connects the extension interface circuits EIF to EIFn and the subscriber line interface circuits SIF1 to SIFm under the control of the time switch controller TSC.

The clock monitor 1200 comprises a counter and a clock generator. Frame signals output from the subscriber line interface circuits SIF1 to SIFm are input to the reset terminal of the counter. The counter counts clocks generated by the clock generator, and resets its count value each time it receives a frame signal. When the frame signal is not continuously input for a period corresponding to three pulses, the count value overflows, and the counter generates a time-out signal. The time-out signal is supplied to a CPU 1100a in the control unit 1100.

The central control unit 1100 has the CPU 1100a. The CPU 1100a is connected to a memory circuit 1100b and an external interface circuit 1100c via a bus. The memory circuit 110b includes a ROM and a RAM, which store programs, control data, and the like required for the control operation of the CPU 1100a. The control data include an error table 1111c. The arrangement of the error table 1111c is the same as that shown in FIG. 5. The external interface circuit 1100c is connected to a maintenance terminal device 190 via a communication path 180. The maintenance terminal device comprises, e.g., a personal computer, and is used for inputting various control data required for the operation of the digital private branch exchange PBX and for confirming the operation state of the digital private branch exchange PBX.

The CPU 1100a has a transmission error storage control function 1101, a start mode discrimination function 1102, and a start mode display control function 1103 in addition to a normal exchange control function.

When detection information of a transmission error is transferred from the subscriber line interface circuits SIF1 to SIFm, the transmission error storage function 1101 stores the detection information in the error table 1111c in the memory circuit 1100b. Upon reception of a read instruction of a registered transmission error by means of a special service number from one of the extension terminal devices TEL and FAX, the function 1101 reads out detection information of the transmission error from the error table 1111c and transfers the read-out information to the corresponding extension terminal device.

The start mode discrimination function 1102 discriminates based on time-out signals supplied from the subscriber line interface circuits SIF1 to SIFm whether the normal start mode or the call start mode is set for the digital subscriber lines SL1 to SLm.

When the start mode discrimination function 1102 discriminates that the normal start mode is not set, the start mode display control function 1103 determines that the start modes are not correctly set for the digital subscriber lines SL1 to SLm. The function 1103 generates alarm information representing that the start modes are not correctly set, and supplies it from the extension interface circuits EIF1 to EIFn to the extension terminal devices TEL and FAX. Upon reception of the alarm information, the extension terminal devices TEL and FAX decode the contents of the information and display the decoded contents on LCD displays 300a and 310a.

The operation of the digital private branch exchange with the above-mentioned arrangement will be explained below.

Assume that a frame error, a multiframe error, or a violation has occurred on one of the digital subscriber lines SL1 to SLm during transmission of a digital signal. Then, occurrence of the transmission error is detected by a corresponding one of the subscriber line interface circuits SIF1 to SIFm, and the detection information is supplied to the CPU 1100a. The CPU 1100a monitors transfer of the detection information. In this state, when the detection information of the transmission error is transferred from one of the subscriber line interface circuits SIF1 to SIFm, the CPU 1100a identifies the type of the transmission error on the basis of the contents of the detection information. As a result of this identification, if the transmission error is a frame error, the CPU 1100a increments the value of a counter for counting the number of times of occurrence of errors. The CPU 1100a stores the error type in the error table 1111c in the memory circuit 1100b. In addition, the CPU 1100a stores the count value of the counter, i.e., the number of times of occurrence of errors and error occurrence time in correspondence with the error type in the memory circuit 1100b.

In this state, for example, assume that a maintenance person dial-inputs a special service number for requesting display of the transmission error detection information at an arbitrary extension terminal device. Upon reception of the special service number from the extension terminal device, the CPU 1100a reads out one detection information from the error table 1111c in the memory circuit 1100b, and outputs the readout detection information to the extension terminal device, as the special service number output source, via the corresponding one of the extension interface circuits EL1 to ELm. Upon reception of the detection information from the digital private branch exchange PBX after output of the special service number, the extension terminal device displays the detection information on the LCD display 300a or 310a.

Similarly, each time a special service number is dial-input at the extension terminal device, detection information is sequentially read out from the error table 1111c in the digital private branch exchange PBX and is supplied to the extension terminal device, and the information is displayed on the LCD display 300a. When the maintenance person dial-inputs an end special service number, the CPU 1100a in the digital private branch exchange PBX ends error transfer/display control after it confirms reception of the end special service number.

On the other hand, the start mode is monitored and displayed as follows.

More specifically, after an engineering work for connecting the digital private branch exchange PBX to the public digital network NW, a maintenance person conducts a call originating or call terminating test for the public digital network NW. During this test, network clocks are supplied from the public digital network NW to the digital subscriber lines SL1 to SLm.

At this time, the clock monitor 1200 performs a count operation of clocks using frame signals output from the subscriber line interface circuits SIF1 to SIFm as reset signals. In this count operation, as long as a frame signal is input, i.e., as long as network clocks are supplied from the public digital network NW, the count value of the counter is reset, and no time-out signal is generated. In contrast to this, when supply of network clocks from the public digital network NW stops, and no frame signal is input, the counter generates a time-out signal after an elapse of a time interval corresponding to three periods of the frame signal. Information representing this time-out signal is supplied to the CPU 1100a in the control unit 1100.

When the call originating or terminating test is finished, the main CPU 1100a in the control unit 1100 executes start mode discrimination and call processing/information control. More specifically, the CPU 1100a monitors whether or not a predetermined period of time (e.g., 30 seconds) has elapsed after a speech communication of the call originating or terminating test. If 30 seconds have elapsed, the CPU 1100a fetches information representing a time-out signal from the clock monitor 1200. Then, the CPU 1100a checks if the time-out signal is at "H" level. As a result, if the time-out signal is not at "H" level, the CPU 1100a determines that the normal start mode is set for the digital subscriber lines SL1 to SLm, and permits the following call processing control.

On the other hand, assume that the time-out signal is at "H" level. In this case, the CPU 1100a determines that the call start mode is set for the digital subscriber lines SL1 to SLm, and inhibits the following call processing control. At the same time, the CPU 1100a generates alarm information and transfers it to the extension terminal device via the corresponding extension interface circuit EIF. The alarm information is decoded, and is displayed on the LCD display 300a or 310a.

Therefore, a maintenance person can confirm that the normal start mode is not set for the digital subscriber lines SL1 to SLm by observing the alarm information displayed on the LCD display 300a or 310a. Then, the maintenance person can request a maintenance person of the public digital network NW to re-set the normal start mode.

As described above, according to the digital private branch exchange PBX of this embodiment, each time a transmission error occurs on the digital subscriber line, detection information of the error is automatically stored in the error table 1111c, and is displayed on the LCD display 300a in accordance with a display request from the extension terminal device. For this reason, a maintenance person can easily and accurately diagnose the cause of occurrence of the error within a short period of time, and can quickly and adequately take a countermeasure against a fault.

Also, according to the digital private branch exchange PBX of this embodiment, whether the start mode set for the digital subscriber lines SL1 to SLm by the public digital network NW is the normal start mode is discriminated in the digital private branch exchange PBX. As a result of discrimination, if it is determined that the normal start mode is not set, alarm information is transferred to the extension terminal device and is displayed. Therefore, the setting error of the start mode can be quickly and clearly informed to a maintenance person. Therefore, the maintenance person can re-set the start mode at an early timing, and an operation in a wrong start mode can be prevented from being started.

Note that the present invention is not limited to the above embodiments. For example, in the first embodiment, transmission error information is stored in the digital key telephone main unit 1, the stored information is transferred to the digital key telephone 3, and the transferred information is displayed on the LCD display 3a of the telephone. However, as shown in, e.g., FIG. 14, a liquid crystal display (LCD) 17 may be connected to the control unit 11 in the digital key telephone main unit 1 via an LCD drive circuit 16, and transmission error information may be displayed on the LCD 17.

Figure 15:
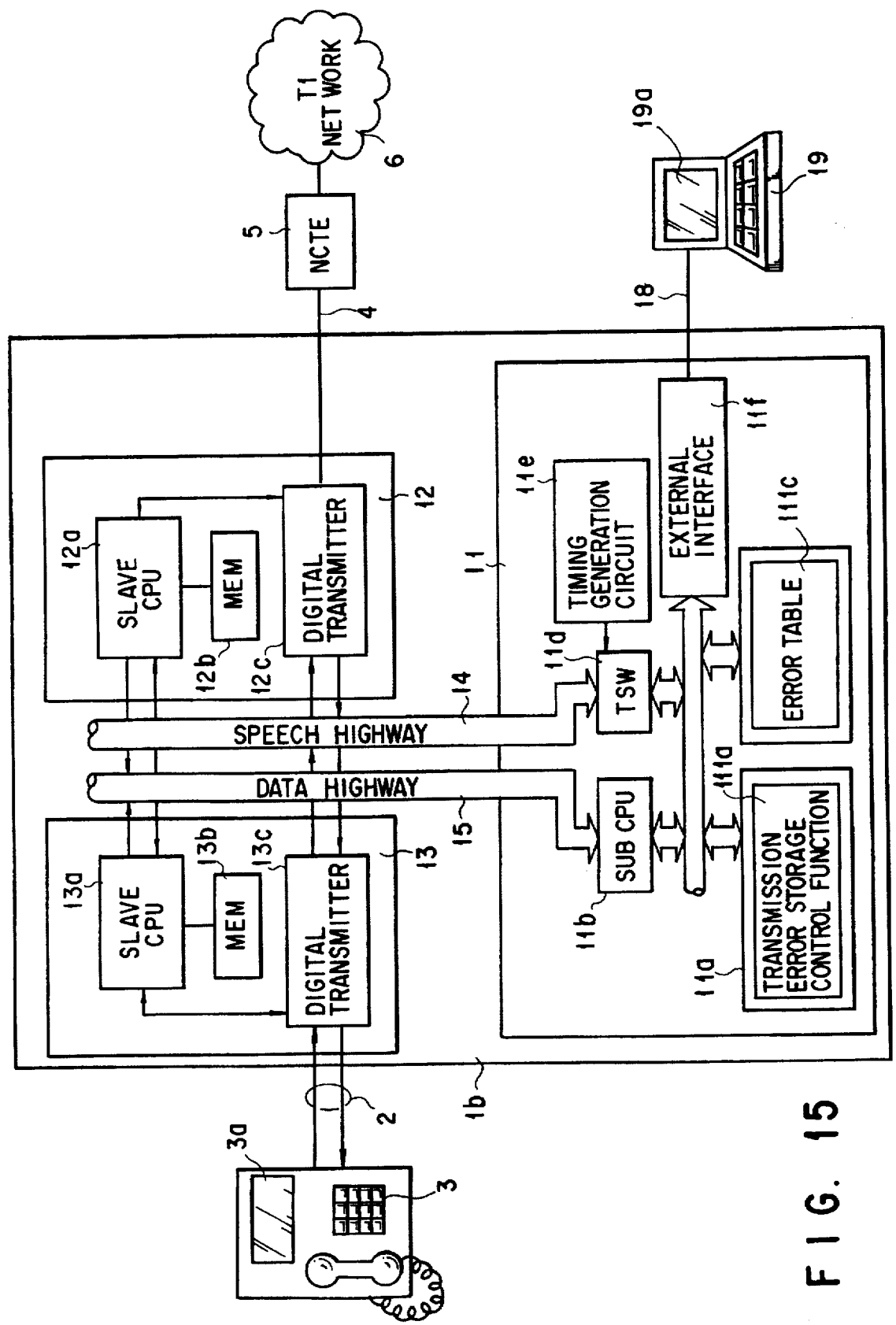

Alternatively, as shown in FIG. 15, a maintenance terminal device 19 comprising, e.g., a personal computer may be connected to the digital key telephone main unit 1 via a communication path 18. Transmission error information may be transferred from an external interface 11f in the control unit 11 to the maintenance terminal device 19 via the communication path 18, and may be displayed on a display of the maintenance terminal device 19.

Figure 14:
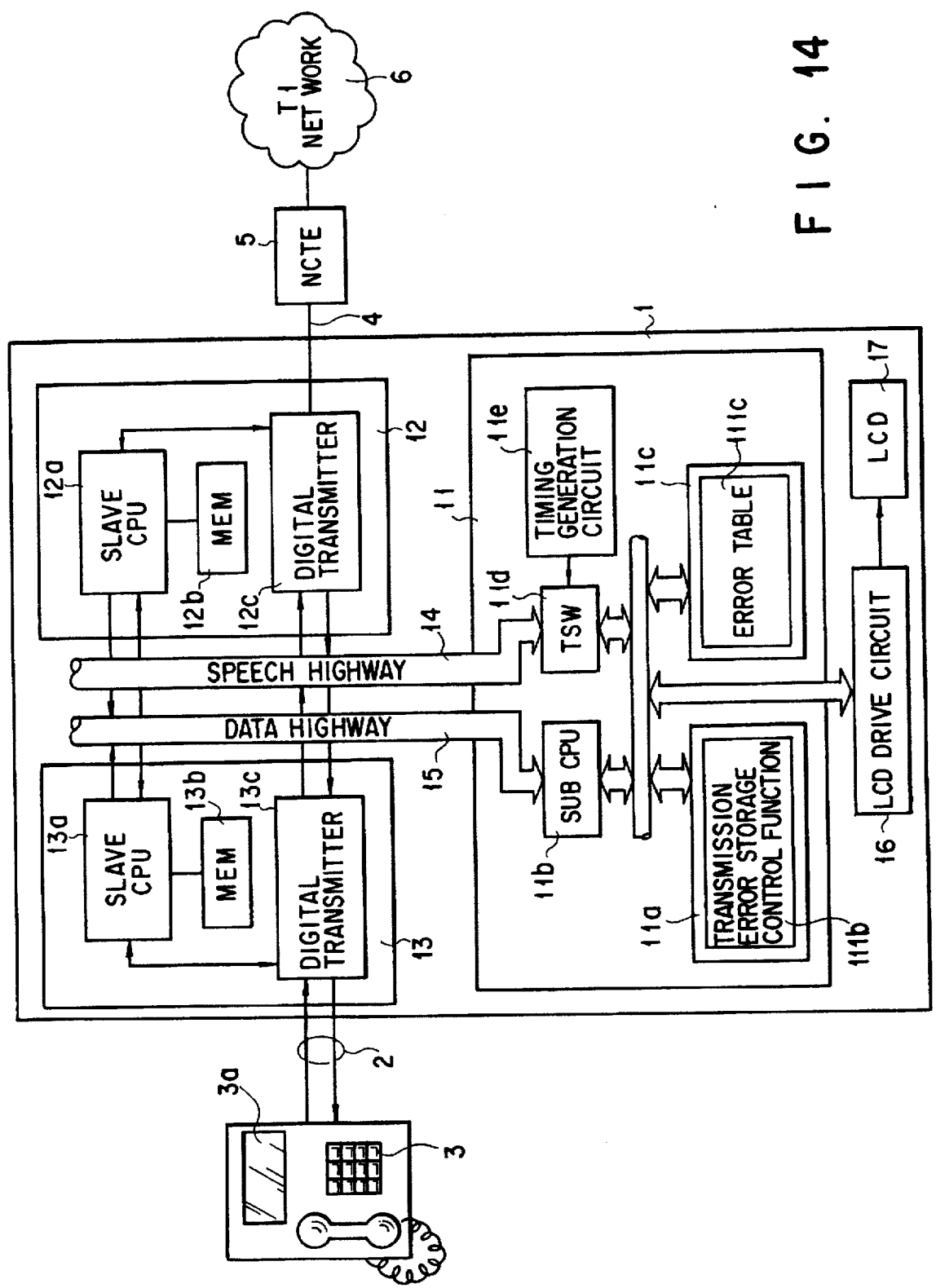
FIGS. 14 and 15 are block diagrams showing modifications of the digital key telephone system according to the first embodiment.

In the second embodiment, the start mode discrimination result is transferred from the digital key telephone main unit 10 to the digital key telephone 30, and is displayed on the LCD display 30a of the telephone. However, a liquid crystal display (LCD) may be connected to the control unit in the digital key telephone main unit via an LCD drive circuit, and information representing the start mode discrimination result may be displayed on the LCD. This arrangement can be realized by arranging the digital key telephone main unit, as shown in FIG. 14.

Alternatively, a maintenance terminal device comprising, e.g., a personal computer may be connected to the digital key telephone main unit via a communication path. Information representing the start mode discrimination result may be transferred from an external interface in the control unit to the maintenance terminal device via the communication path, and may be displayed on a display of the maintenance terminal device. This arrangement can be realized by one shown in FIG. 15.

Furthermore, in the second embodiment, only when it is determined as a result of discrimination of the start mode that the normal start mode is not set, alarm information is generated and displayed. When it is determined that the normal start mode is correctly set, information indicating this may be displayed.

In addition, the digital key telephone system may comprise a transmission error storage control function, a transmission error display control function, a start mode discrimination function, and a start mode display control function, and may display both transmission error detection information and start mode discrimination information.

In the third embodiment, both transmission error detection information and start mode discrimination information are transferred from the digital private branch exchange PBX to the extension terminal device, and are displayed on the LCD display 300a or 310a of this extension terminal device. However, the transmission error detection information and start mode discrimination information may be transferred from the digital private branch exchange PBX to the maintenance terminal device 190, and may be displayed on an LCD display 190a of the maintenance terminal device 190.

Furthermore, in each of the above embodiments, a digital terminal device such as a digital key telephone is used as the extension terminal device. However, when an analog terminal device such as an analog telephone is used as the extension terminal device, transmission error detection information and start mode discrimination information as digital data cannot be transferred thereto. In this case, the digital key telephone main unit or the digital private branch exchange generates a voice message representing the transmission error detection information or start mode discrimination information using a speech synthesizing circuit. The voice message may be transferred to the analog terminal device and may be output via a handset or a loudspeaker.

In addition, the types and arrangements of digital networks, digital exchange systems, and extension terminal devices, the control sequence and control contents of transmission error detection means and transmission error storage control means, the control sequence and control contents of start mode discrimination means and information means, the types of networks to be connected, and the like may be variously modified within the spirit and scope of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A digital exchange apparatus which is connected to a digital communication network via a plurality of digital channels, and operates in synchronism with network clocks supplied from the digital communication network via one of the plurality of digital channels, comprising:

mode discrimination means for discriminating whether a start mode set in correspondence with said one of the digital channels which receives the network clocks is a first start mode for normally supplying the network clocks or a second start mode for supplying the network clocks only during a specific period including a communication period upon generation of a call; and mode display means for displaying the start mode discriminated by said mode discrimination means.

2. A digital exchange apparatus according to claim 1, wherein said mode display means displays alarm information when the start mode discriminated by said mode discrimination means is the second start mode.

3. A digital exchange apparatus, which is connected to a digital communication network via a plurality of digital channels, is connected to an extension terminal device via an extension transmission path, and operates in synchronism with network clocks supplied from the digital communication network via one of the plurality of digital channels, comprising:

mode discrimination means for discriminating whether a start mode set in correspondence with said one of the plurality of channels which receives the network clocks is a first start mode for normally supplying the network clocks or a second start mode for supplying the network clocks only during a specific period including a communication period upon generation of a call; and display control means for controlling said display to display the information representing the start mode discriminated by said mode discrimination means.

4. A digital exchange apparatus, which is connected to a digital communication network via a plurality of digital channels, is connected to an extension terminal device via an extension transmission path, and operates in synchronism with network clocks supplied from the digital communication network via one of the plurality of digital channels, comprising:

mode discrimination means for discriminating whether a start mode set in correspondence with said one of the plurality of channels which receives the network clocks is a first start mode for normally supplying the network clocks or a second start mode for supplying the network clocks only during a specific period including a communication period upon generation of a call; and display control means for controlling said display to display the information representing the start mode discriminated by said mode discrimination means, wherein said display control means transfers the information representing the start mode discriminated by said mode discrimination means to the extension terminal device via the extension transmission path, and displays the transferred information on a display of the extension terminal device.

5. A digital exchange apparatus, which is connected to a digital communication network via a plurality of digital channels, is connected to an extension terminal device via an extension transmission path, and operates in synchronism with network clocks supplied from the digital communication network via one of the plurality of digital channels, comprising:

mode discrimination means for discriminating whether a start mode set in correspondence with said one of the plurality of channels which receives the network clocks is a first start mode for normally supplying the network clocks or a second start mode for supplying the network clocks only during a specific period including a communication period upon generation of a call; and display control means for controlling said display to display the information representing the start mode discriminated by said mode discrimination means, wherein said digital exchange apparatus further comprises a maintenance terminal device connected thereto via a transmission path, and causes said display control means to transfer the information representing the start mode discriminated by said mode discrimination means to the maintenance terminal device via the transmission path, and to display the transferred information on a display of the maintenance terminal device.

6. A digital exchange apparatus according to claim 3, wherein said mode display means displays alarm information when the start mode discriminated by said mode discrimination means is the second start mode.

7. A digital exchange apparatus according to claim 3, wherein said display control means controls said start mode discriminated by said mode discrimination means to be displayed in the display when said digital exchange apparatus has a display.

* * * * *